United States Patent
Dukes

[15] 3,679,934
[45] July 25, 1972

[54] AUTOMATIC RESTARTING LASER POWER SUPPLY

[72] Inventor: John N. Dukes, Los Altos Hills, Calif.
[73] Assignee: Hewlett-Packard Company, Palo Alto, Calif.
[22] Filed: Feb. 5, 1970
[21] Appl. No.: 8,772

[52] U.S. Cl. .......................... 315/200 R, 307/297, 315/171, 315/173, 315/176, 315/205, 315/241 R, 315/DIG. 5
[51] Int. Cl. ..................................................... H05b 41/14
[58] Field of Search................. 315/160, 167, 170, 171, 173, 315/176, 200 R, 202, 205, 241 R, 245, DIG. 5; 307/297

[56] References Cited

UNITED STATES PATENTS

| | | | |
|---|---|---|---|
| 3,453,490 | 7/1969 | Hallock et al. | 315/241 X |
| 3,066,243 | 11/1962 | Mutschler | 315/176 |
| 3,229,159 | 1/1966 | Webb | 315/171 |

*Primary Examiner*—Alfred L. Brody
*Attorney*—Roland I. Griffin

[57] ABSTRACT

A gas laser is connected in series with a diode and a power supply for maintaining the discharge in the laser. When the laser extinguishes, a capacitor connected in parallel with the diode is charged by an additional power supply to provide the additional voltage necessary to restart the laser.

4 Claims, 3 Drawing Figures

PATENTED JUL 25 1972 3,679,934

INVENTOR
JOHN N. DUKES

BY Roland J. Griffin
ATTORNEY

AUTOMATIC RESTARTING LASER POWER SUPPLY

BACKGROUND AND SUMMARY OF THE INVENTION

This invention relates to power supplies for gaseous discharge tubes and more particularly to an improved power supply with circuitry for automatically restarting a gas laser.

In the past the gas laser has been powered by an inefficient and cumbersome power supply. The voltage to start a laser is two to three times greater than that needed to maintain the discharge. Some power supplies provided the full voltage necessary to start the laser at all times and used a dropping resistor in series with the supply and the laser to provide the proper voltage for maintaining the discharge. That technique wastes power in the dropping resistor; and, if the power supply gets its power from an a.c. source, the transformer must have a higher voltage rating than would be necessary for delivering the maintaining voltage. An alternative method provided two separate supplies, one for maintaining and one for starting the laser. If the laser extinguished, the starting supply had to be manually switched into the circuit until the laser restarted, and then switched out again. This method required a large piece of equipment, since two separate supplies were used, each with its own power transformer and associated circuitry.

An objective of this invention is to overcome the difficulties and problems cited above. In a preferred embodiment of this invention the laser is connected in series with a maintaining power supply and a diode, so the diode conducts when the laser is operating. The power supply comprises a transformer, rectifier and filter capacitor, since in use it is connected to an a.c. source. A capacitor is connected in parallel with the diode and an additional current limited power supply is connected in parallel with the capacitor. When the laser extinguishes the diode stops conducting, and the capacitor is charged by the additional supply; the laser restarts when the sum of the voltages on the maintaining supply and the capacitor equals the laser ignition voltage. The additional supply is connected to the same transformer as the maintaining supply, so only one lower voltage transformer is necessary, in contrast with the previous designs described. The additional supply provides less current than the maintaining supply, at about the same voltage, so it is more efficient than previous designs. The restarting is automatic, so operator attention is not required, which tends to increase the dependability of the laser. The rectifier circuits are so arranged that the most voltage any one rectifier diode sees is one-half of the transformer peak-to-peak output voltage, which allows the use of lower voltage rectifier diodes than previous designs.

DESCRIPTION OF THE PREFERRED EMBODIMENTS

Figure 1:
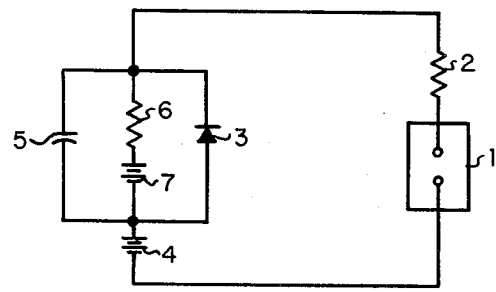
FIGS. 1 and 2 are simplified schematic representations of power supplies with automatic restart circuits in accordance with two of the preferred embodiments of this invention.

Referring to FIG. 1, a gaseous discharge tube such as a gas laser 1, a ballast resistor 2, a diode 3 and a power supply 4 are connected in series such that current flows through diode 4 when the tube is operating. A capacitor 5 is connected in parallel with diode 3, and a power supply 7 and a resistor 6 are also serially connected in parallel with diode 3. When diode 3 is conducting, it essentially short circuits capacitor 5 and the series elements 6 and 7. If gas laser 1 extinguishes it appears to be an open circuit and no more current flows through diode 3, which then also appears to be an open circuit. Power supply 7 will then charge capacitor 5 through resistor 6 until the sum of the voltages on capacitor 5 and power supply 4 is enough to restart the discharge in gas laser 1. Once the discharge is started, current again flows through diode 3, so it again appears to be a short circuit. Resistor 6 is large enough so that the current drawn from power supply 7 is a small fraction (less than 0.1) of the current drawn from power supply 4 when diode 3 is conducting.

Figure 2:
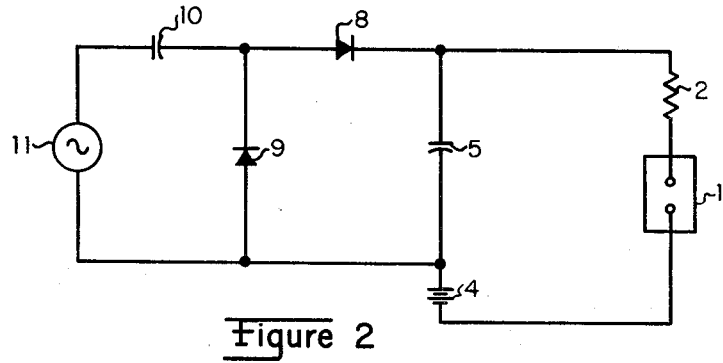

Referring to FIG. 2, a gas laser 1, a ballast resistor 2, a power supply 4 and two diodes 8 and 9 are connected in series such that current flows through both diodes when the gas laser is operating. A capacitor 5 is connected in parallel with diodes 8 and 9, and an a.c. power source 11 and a capacitor 10 are serially connected in parallel with diode 9. Capacitor 10, diodes 8 and 9 and capacitor 5 act as a voltage doubler. Diodes 8 and 9 also perform the same function as diode 3 in FIG. 1 when the tube is operating and current is flowing from power supply 4 to the tube. The current drain on a.c. source 11 is limited by the ratio of capacitor 10 to capacitor 5 when capacitor 5 is being charged. When gas laser 1 is operating and diodes 8 and 9 are conducting continuously, the only load on a.c. source 11 is essentially the reactance of capacitor 10, which is chosen to be a high impedance compared with the tube so the current drain on a.c. source 11 is less (by a factor of 10) than the current drain on supply 4. Therefore capacitor 10 serves the same current limiting function as resistor 6 in FIG. 1.

Figure 3:
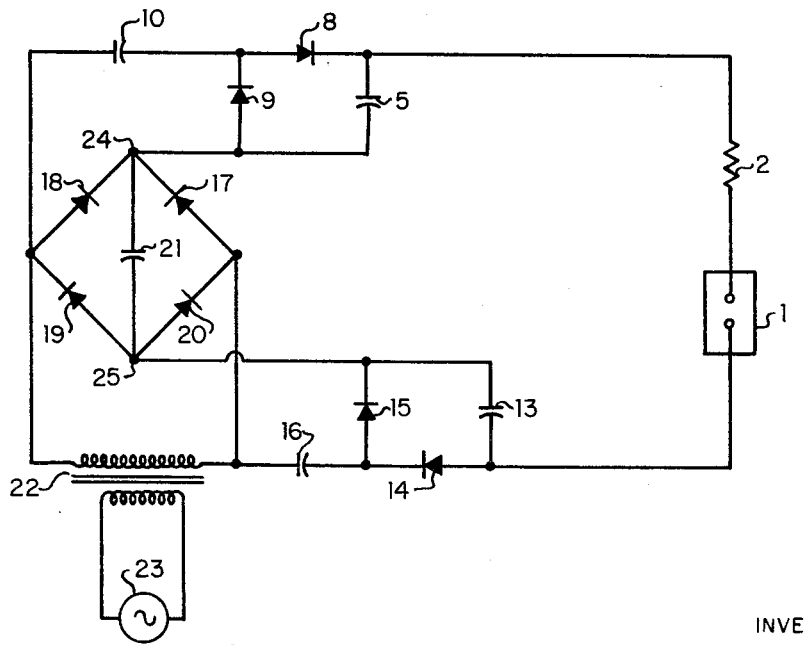
FIG. 3 is a detailed schematic representation of a power supply with an automatic restart circuit in accordance with another of the preferred embodiments of this invention.

Referring to FIG. 3, a gas laser 1, a ballast resistor 2, two diodes 8 and 9, a capacitor 21, and two additional diodes 14 and 15 are connected in series. Capacitor 21 is the smoothing or filter capacitor for the rectifier bridge comprised of diodes 17, 18, 19 and 20 which in turn is supplied with a.c. power by transformer 22. An a.c. source 23, for example, a.c. line voltage or an inverter connected to a d.c. source, supplies a.c. power to transformer 22. In this embodiment there are two automatic restarting circuits of the form shown in FIG. 2, which provide for a maximum starting voltage approximately three times the open circuit maintaining voltage. The first automatic restarting circuit is comprised of elements 5, 8, 9 and 10, and it is supplied with a.c. power by being connected to one side of transformer 22 and node 24 on the rectifying bridge. The second automatic restarting circuit is comprised of elements 13, 14, 15 and 16, and it is supplied with a.c. power by being connected to the other side of transformer 22 and node 25 on the rectifying bridge. Here it is shown that one transformer 22 can be used to supply power to one maintaining supply and two automatic restarting circuits.

I claim:

1. An apparatus for starting, maintaining and automatically restarting the discharge in a gaseous discharGe tube comprising:
    a first source of power for maintaining tube discharge;
    a ballast device;
    a unidirectional conducting device, comprising at least two series connected rectifying devices, connected in series with the first source of power, the tube and the ballast device, the unidirectional conducting device being poled to conduct during tube discharge;
    an energy storage device connected in parallel with the unidirectional conducting device;
    a second source of power for supplying a.c. power; and
    a voltage doubler circuit connected to the second source of power, the circuit including the unidirectional conducting device and the energy storage device.

2. An apparatus as in claim 1 wherein the gaseous discharge tube is a gas laser.

3. An apparatus for starting, maintaining and automatically restarting the discharge in a gaseous discharge tube comprising:
    a power supply connectable to a source of a.c. power and having a first output for supplying power to maintain tube discharge and a second output for supplying a.c. power, the power supply including rectifying means connected to the first output and a filter device connected across the first output;
    a ballast device;
    a unidirectional conductive device comprising at least two series connected rectifying devices connected in series with the first output of the power supply, the tube and the ballast device, the unidirectional conducting device being poled to conduct during tube discharge;

an energy storage device connected in parallel with the unidirectional conducting device;

a voltage doubler circuit connected to the second output of the power supply, the circuit including the unidirectional conducting device and the energy storage device.

4. An apparatus as in claim 3 wherein:

the power supply has a third output for supplying a.c. power;

the rectifying means comprises a full wave diode bridge including four diodes, the second output being connected across one diode of the bridge and the third output being connected across another nonadjacent diode of the bridge; and there is an additional voltage doubler circuit connected to the third output of the power supply, the additional circuit including an additional unidirectional conducting device connected in series with the previously recited unidirectional conducting device, the first output of the power supply, the tube, and the ballast device.

* * * * *